(12) United States Patent
Horie

(10) Patent No.: US 8,483,435 B2
(45) Date of Patent: Jul. 9, 2013

(54) INFORMATION PROCESSING DEVICE, INFORMATION PROCESSING SYSTEM, INFORMATION PROCESSING METHOD, AND INFORMATION STORAGE MEDIUM

(75) Inventor: Kazuyoshi Horie, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 274 days.

(21) Appl. No.: 13/084,130

(22) Filed: Apr. 11, 2011

(65) Prior Publication Data

US 2011/0255742 A1    Oct. 20, 2011

(30) Foreign Application Priority Data

Apr. 16, 2010    (JP) ................................. 2010-095346

(51) Int. Cl.
*G06K 9/00*        (2006.01)
*A63F 13/00*       (2006.01)

(52) U.S. Cl.
USPC .............................. 382/103; 382/291; 463/43

(58) Field of Classification Search
USPC ................. 382/100, 103, 106–107, 154, 155, 382/162, 168, 173, 181, 189, 199, 203, 232, 382/254, 274, 276, 286–299, 305, 312; 725/37; 715/716; 463/3, 42, 43
See application file for complete search history.

(56) References Cited

U.S. PATENT DOCUMENTS

| | | | |
|---|---|---|---|
| 6,394,895 B1 * | 5/2002 | Mino | 463/3 |
| 6,929,549 B1 * | 8/2005 | Yamada | 463/42 |
| 6,999,603 B1 * | 2/2006 | Ito | 382/107 |
| 7,669,126 B2 * | 2/2010 | Morita et al. | 715/716 |
| 2006/0277571 A1 * | 12/2006 | Marks et al. | 725/37 |
| 2010/0137046 A1 | 6/2010 | Kataoka | |

FOREIGN PATENT DOCUMENTS

| | | |
|---|---|---|
| JP | 63-132685 A | 6/1988 |
| JP | 6-134143 A | 5/1994 |
| JP | 8-293810 A | 11/1996 |
| JP | 2001-137556 A | 5/2001 |
| WO | 2008129792 A1 | 10/2008 |

OTHER PUBLICATIONS

Office Action for corresponding JP application No. 2010-095346, dated Jan. 10, 2012.
Office Action for corresponding JP application No. 2010-095346, dated Dec. 4, 2012.

* cited by examiner

*Primary Examiner* — Seyed Azarian
(74) *Attorney, Agent, or Firm* — Matthew B. Dernier, Esq.; Gibson & Dernier LLP

(57) ABSTRACT

A situation data obtaining unit obtains situation data describing a situation of an image capturing target of which image is captured by an image capturing device for producing an image to be output. Based on the situation data, a simulation process executing unit carries out a simulation process for simulating a behavior of the image capturing target after the situation of the image capturing target, described by the situation data. A combined screen image output unit outputs a result of the simulation process by the simulation process executing unit. The simulation process executing unit changes the behavior of the image capturing target in the simulation process in response to an operation received from a user.

17 Claims, 7 Drawing Sheets

US 8,483,435 B2

INFORMATION PROCESSING DEVICE, INFORMATION PROCESSING SYSTEM, INFORMATION PROCESSING METHOD, AND INFORMATION STORAGE MEDIUM

CROSS-REFERENCE TO RELATED APPLICATIONS

The present application claims priority from Japanese application JP 2010-095346 filed on Apr. 16, 2010, the content of which is hereby incorporated by reference into this application.

BACKGROUND OF THE INVENTION

1. Field of the Invention

The present invention relates to an information processing device, an information processing system, an information processing method, and an information storage medium.

2. Description of the Related Art

Devices capable of obtaining data via broadcasting are available. U.S. Pat. No. 6,929,549 B discloses a game device system to which game programs and game data are supplied via media of large transmission capacity, such as broadcasting, dedicated lines, and so forth. In addition, television sets capable of receiving weather forecast data, news data, and so forth, together with motion pictures for TV programs are available.

SUMMARY OF THE INVENTION

In TV broadcasting of sports (e.g., soccer, golf, and so forth), by capturing images of image capturing targets, such as players, balls, and so forth, using an image capturing device such as a TV camera or the like, captured images such as motion pictures or the like are produced. The capture images such as motion pictures or the like are output via a broadcasting network or the like to an output device such as a television set or the like watched by a viewer.

When the real world expressed by a captured image such as a motion picture or the like output to the output device such as a television set or the like is well coordinated with a game (e.g., sport games such as soccer games, golf games, and so forth) that simulates the real world, a TV viewer (a game player) can more enjoy TV broadcasting and games. Specifically, for example, if a TV viewer can play a game that simulates a situation in sport on the air (e.g., a scene with a corner kick in soccer, a scene with an approach shot in golf, and so forth), the TV viewer (a game player) can experience the sport being performed in the real world by playing the game.

This is not limited to TV broadcasting and games. On information processing devices that carry out a simulation process, in general, when a situation in which an image capturing target of which image is captured by an image capturing device is situated (a situation of an image capturing target) is well coordinated with a simulation process carried out in the information processing device, a user of the information processing device can more enjoy the simulation process.

The present invention has been conceived in view of the above, and aims to provide an information processing device, an information processing system, an information processing method, and an information storage medium that can enhance coordination between a situation in the real world and a simulation process, compared to in a conventional case.

In order to solve the above described problem, according to one aspect of the present invention, there is provided an information processing device comprising a situation data obtaining unit for obtaining situation data describing a situation of an image capturing target of which image is captured by an image capturing unit for producing an image to be output; a simulation process executing unit for carrying out, based on the situation data, a simulation process for simulating a behavior of the image capturing target after the situation of the image capturing target, described by the situation data; and an output unit for outputting a result of the simulation process by the simulation process executing unit, wherein the simulation process executing unit may change the behavior of the image capturing target in the simulation process in response to an operation received from a user.

According to another aspect of the present invention, there is provided an information processing system including a first image processing device and a second image processing device, wherein the first information processing device may include a situation data producing unit for producing situation data describing a situation of an image capturing target of which image is captured by an image capturing unit for producing an image to be output, and a situation data output unit for outputting the situation data produced by the situation data producing unit, the second information processing device may include a situation data obtaining unit for obtaining the situation data, a simulation process executing unit for carrying out, based on the situation data, a simulation process for simulating a behavior of the image capturing target after the situation of the image capturing target, described by the situation data, and an output unit for outputting a result of the simulation process by the simulation process executing unit, and the simulation process executing unit may change the behavior of the image capturing target in the simulation process in response to an operation received from a user.

According to still another aspect of the present invention, there is provided an information processing method comprising a situation data obtaining step of obtaining situation data describing a situation of an image capturing target of which image is captured by an image capturing unit for producing an image to be output; a simulation process executing step of carrying out, based on the situation data, a simulation process for simulating a behavior of the image capturing target after the situation of the image capturing target, described by the situation data; and an output step of outputting a result of the simulation process executed at the simulation process executing step, wherein at the simulation process executing step, the behavior of the image capturing target in the simulation process may be changed in response to an operation received from a user.

According to still another aspect of the present invention, there is provided a computer readable information storage medium for storing a program that causes a computer to function as a situation data obtaining unit for obtaining situation data describing a situation of an image capturing target of which image is captured by an image capturing unit for producing an image to be output; a simulation process executing unit for carrying out, based on the situation data, a simulation process for simulating a behavior of the image capturing target after the situation of the image capturing target, described by the situation data; and an output unit for outputting a result of the simulation process by the simulation process executing unit, wherein the simulation process executing unit may change the behavior of the image capturing target in the simulation process in response to an operation received from a user.

According to the present invention, based on the situation data describing a situation of an image capturing target, the behavior of the image capturing target after the situation of the image capturing target, described by the situation data is simulated. Thus, it is possible to enhance coordination between a situation in the real world and the simulation process, compared to a conventional case.

In one embodiment of the present invention, the situation data may include corresponding time data specifying a time relating to the situation of the image capturing target, and the simulation process executing unit may carry out a simulation process for simulating the behavior of the image capturing target after the time specified by the corresponding time data. With this arrangement, it is possible to specify the start time of a behavior of an image capturing target, based on the corresponding time data, and to simulate the behavior of the image capturing target after the specified time.

In one embodiment of the present invention, the situation data may specify at least a position of the image capturing target, and the simulation process executing unit may carry out a simulation process for simulating the behavior of the image capturing target after a situation in which the image capturing target is placed in the position specified by the situation data. With this arrangement, it is possible to simulate placement of the image capturing target.

In one embodiment of the present invention, the situation data obtaining unit may obtain a plurality of situation data, and the simulation process executing unit, based on the situation data selected by a user from among the plurality of situation data, may carry out a simulation process for simulating the behavior of the image capturing target after the situation of the image capturing target, described by the situation data. With this arrangement, a user can select the situation data to be used as a base of a simulation process.

In one embodiment of the present invention, the information processing device may further comprise an event occurrence detecting unit for detecting occurrence of a predetermined event to the image capturing target, wherein the situation data obtaining unit may obtain the situation data upon detection of occurrence of an event by the event occurrence detecting unit. With this arrangement, as a simulation process based on the situation data obtained upon detection of occurrence of an event is carried out, it is possible to carry out a simulation process suitable for the situation in which the event occurs to the image capturing image.

In one embodiment of the present invention, the image capturing unit may produce a motion picture including at least one frame image by capturing an image of the image capturing target, and the information processing device may further comprise a motion picture obtaining unit for obtaining the motion picture produced by the image capturing unit; a motion picture storage unit for storing the motion picture obtained by the motion picture obtaining unit; and a frame image deleting unit for deleting at least a part of at least one frame image included in the motion picture, the part being specified by the situation data. With this arrangement, as a frame image specified based on the situation data is deleted, it is possible to save the data amount to be stored in the motion picture storage unit.

In one embodiment of the present invention, the situation data obtaining unit may obtain situation data describing a part of the situation of the image capturing target of which image is captured by the image capturing unit. With this arrangement, as the situation data describing the whole situation of an image capturing target is not obtained, it is possible to reduce the transmission amount.

According to still another aspect of the present invention, there is provided an information processing device comprising a situation data obtaining unit for obtaining situation data describing a situation in a sport match; an activating unit for reading a game program stored in a storage unit and activating the game program read; a simulation data producing unit for producing simulation data for simulating the sport match, based on the situation data; a simulation process executing unit for carrying out a simulation process based on the simulation data in response to an operation received from a user; and an output unit for outputting a result of the simulation process by the simulation process executing unit.

According to still another aspect of the present invention, there is provided an information processing system including a first image processing device and a second image processing device, wherein the first information processing device may include a situation data producing unit for producing situation data describing a situation in a sport match and a situation data outputting unit for outputting the situation data produced by the situation data producing unit, the second information processing device may include a situation data obtaining unit for obtaining the situation data, an activating unit for reading a game program stored in a storage unit and activating the game program read; a simulation data producing unit for producing simulation data for simulating the sport match, based on the situation data, a simulation process executing unit for carrying out a simulation process based on the simulation data in response to an operation received from a user; and an output unit for outputting a result of the simulation process by the simulation process executing unit.

According to still another aspect of the present invention, there is provided an information processing method comprising a situation data obtaining step of obtaining situation data describing a situation in a sport match; an activating step of reading a game program stored in a storage unit and activating the game program read; a simulation data producing step of producing simulation data for simulating the sport match, based on the situation data; a simulation process executing step of carrying out a simulation process based on the simulation data in response to an operation received from a user; and an output step of outputting a result of the simulation process carried out at the simulation process executing step.

According to still another aspect of the present invention, there is provided a computer readable information storage medium for storing a program that causes a computer to function as a situation data obtaining unit for obtaining situation data describing a situation in a sport match; an activating unit for reading a game program stored in a storage unit and activating the game program read; a simulation data producing unit for producing simulation data for simulating the sport match, based on the situation data; a simulation process executing unit for carrying out a simulation process based on the simulation data in response to an operation received from a user; and an output unit for outputting a result of the simulation process by the simulation process executing unit.

According to still another aspect of the present invention, there is provided an information processing device comprising a broadcasting receiving unit for receiving a broadcasting signal from a broadcasting station; an obtaining unit for obtaining data in accordance with the broadcasting signal received by the broadcasting receiving unit from outside; and a game program executing unit for executing a game program, wherein the game program executing unit may output information in accordance with the data obtained by the obtaining unit, and the game program executing unit may change content of execution of the game program in response to an operation by a user.

According to still another aspect of the present invention, there is provided an information processing system including a first image processing device and a second image processing device, wherein the first information processing device may include a data output unit for outputting data in accordance with a request received from the second information processing device, the second information processing device may include a broadcasting receiving unit for receiving a broadcasting signal from a broadcasting station, an obtaining unit for obtaining data in accordance with the broadcasting signal received by the broadcasting receiving unit from the first information processing device, and a game program executing unit for executing a game program, the game program executing unit may output information in accordance with the data obtained by the obtaining unit, and the game program executing unit may change content of execution of the game program in response to an operation by a user.

According to still another aspect of the present invention, there is provided an information processing method comprising a broadcasting receiving step of receiving a broadcasting signal from a broadcasting station; an obtaining step of obtaining data in accordance with the broadcasting signal received at the broadcasting receiving step from outside; and a game program executing step of executing a game program, wherein at the game program executing step, information in accordance with the data obtained at the obtaining step may be output, and at the game program executing step, content of execution of the game program may be changed in response to an operation by a user.

According to still another aspect of the present invention, there is provided a computer readable information storage medium for storing a program that causes a computer to function as a broadcasting receiving unit for receiving a broadcasting signal from a broadcasting station; an obtaining unit for obtaining data in accordance with the broadcasting signal received by the broadcasting receiving unit from outside; and a game program executing unit for executing a game program, wherein the game program executing unit may output information in accordance with the data obtained by the obtaining unit, and the game program executing unit may change content of execution of the game program in response to an operation by a user.

DETAILED DESCRIPTION OF THE INVENTION

In the following, one embodiment of the present invention will be described in detail with reference to the accompanying diagrams.

Figure 1:
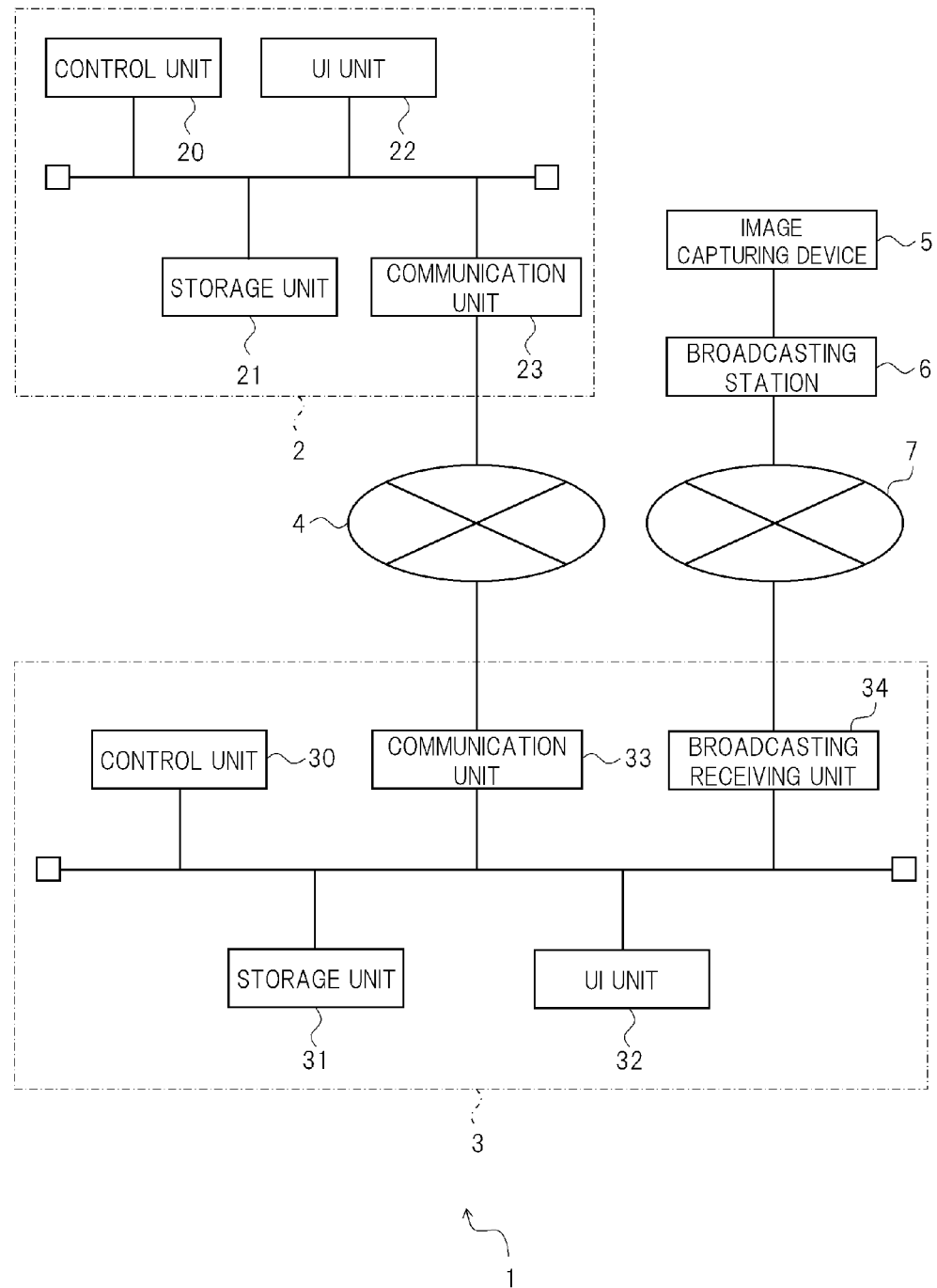
FIG. 1 is a diagram showing one example of a hardware structure of an information processing system according to this embodiment.

FIG. 1 is a diagram showing one example of a hardware structure of an information processing system 1 according to this embodiment. As shown in FIG. 1, the information processing system 1 comprises a first information processing device (e.g., a server 2 in this embodiment), a second information processing device (e.g., a client 3 in this embodiment), an image capturing device 5, and a broadcasting station 6.

The server 2 comprises, e.g., a control unit 20, a storage unit 21, a user interface (UI) unit 22, and a communication unit 23. The client 3 comprises e.g., a control unit 30, a storage unit 31, a user interface (UI) unit 32, a communication unit 33, and a broadcasting receiving unit 34.

The control unit 20 of the server 2 and the control unit 30 of the client 3 are each a program control device such as, e.g., a CPU or the like. The storage unit 21 of the server 2 and the storage unit 31 of the client 3 are each a storage element such as, e.g., a ROM, a RAM, or the like or a hard disk drive. A program to be executed by the control unit 20 of the server 2 or the like is stored in the storage unit 21 of the server 2. The storage unit 21 of the server 2 functions also as a working memory of the control unit 20 of the server 2. Meanwhile, a program to be executed by the control unit 30 of the client 3 or the like is stored in the storage unit 31 of the client 3. The storage unit 31 of the client 3 also functions as a working memory of the control unit 30 of the client 3.

The UI unit 22 of the server 2 is, e.g., a display, a speaker, a mouse, a keyboard, a button, or the like, and outputs the content of an operation carried out by a user or sound input by a user to the control unit 20 of the server 2. Further, the UI unit 22 of the server 2 outputs information as sound or so as to be displayed according to an instruction input from the control unit 20 of the server 2. Meanwhile, the UI unit 32 of the client 3 is, e.g., a display, a speaker, a mouse, a keyboard, a game controller, a remote controller, a button, or the like, and outputs the content of an operation carried out by a user or sound input by a user to the control unit 30 of the client 3. Further, the UI unit 32 of the client 3 outputs information as sound or so as to be displayed according to an instruction input from the control unit 30 of the client 3.

The communication unit 23 of the server 2 and the communication unit 33 of the client 3 are each, e.g., a communication interface such as a network board or the like, and exchange information with each other via the communication network 4 (either wired or radio).

The broadcasting receiving unit 34 of the client 3 comprises, e.g., an antenna, a TV broadcasting tuner, a broadcasting signal decoder, and so forth, and receives a broadcasting signal expressing a motion picture or the like via the broadcasting network 7 (either wired or radio). In this embodiment, the broadcasting receiving unit 34 receives broadcasting signals for a plurality of channels. The broadcasting receiving unit 34 may receive broadcasting signals independently from each of the plurality of broadcasting stations 6. Further, the broadcasting receiving unit 34 may output the received broadcasting signal to another device such as a tuner or the like.

The image capturing device 5 is, e.g., a TV camera or the like, comprising, e.g., a publicly known TV camera, and produces a black/white, grey scaled, or colored image (e.g., a JPEG image) every predetermined period of time (e.g., $\frac{1}{60}^{th}$ of a second), and outputs to the broadcasting station 6. In this embodiment, the image capturing device 5 has a microphone, and outputs input sound data together with an image to the broadcasting station 6.

In this embodiment, the image capturing device 5 produces a frame image and sound data every predetermined period of time (e.g., $\frac{1}{60}^{th}$ of a second), and sequentially outputs the frame image and sound data in a correlated manner to the broadcasting station 6 to thereby output a motion picture correlated to the sound data to the broadcasting station 6.

The image capturing device 5 may output each image (a frame image) to the broadcasting station 6 so as to be correlated to image captured time data relating to image capturing timing (e.g., data specifying an image captured time point, an image captured time instant, and the like). Further, the image capturing device 5 may output a frame image to the broadcasting station 6 so as to be correlated to a frame identifier (e.g., a frame ID).

The broadcasting station 6 outputs a broadcasting signal. In this embodiment, the broadcasting station 6 receives a motion picture correlated to, e.g., sound data from the image capturing device 5, and outputs the motion picture to the client 3 via the broadcasting network 7. The broadcasting station 6 may output each of the frame images contained in the motion picture so as to be correlated to the above described frame ID, the above described image captured time data, broadcasting time data relating to broadcasting output timing, and so forth, to the client 3.

Figure 2:
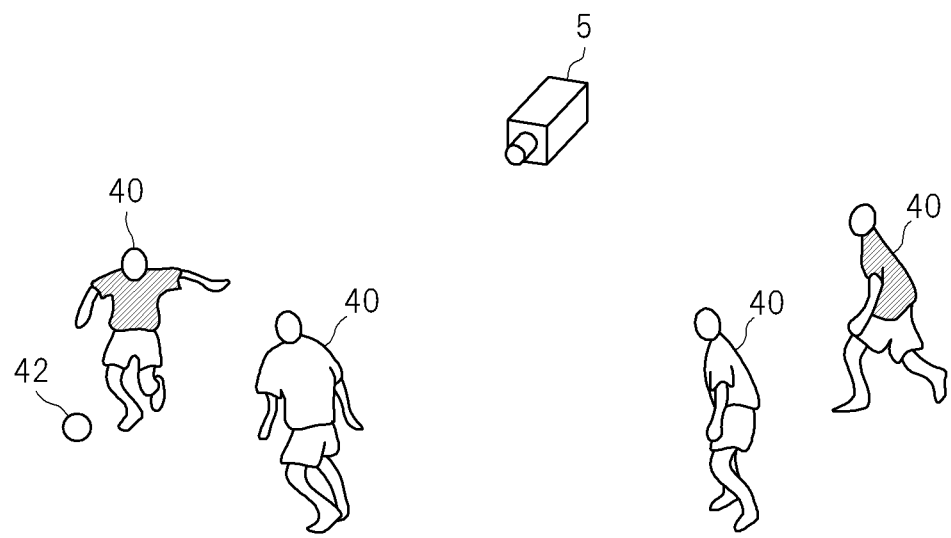
FIG. 2 is a diagram showing one example of a picture in which an image capturing device is capturing an image of a situation in a soccer match being performed in a soccer stadium in this embodiment.

FIG. 2 is a diagram showing an example of a picture in which the image capturing device 5 (e.g., a TV camera) is capturing an image of a situation in a soccer match being performed in a soccer stadium in this embodiment. As shown in FIG. 2, in this embodiment, the image capturing device 5 captures an image of at least one image capturing target such as, e.g., the soccer field, a soccer player 40, the soccer ball 42, and so forth, and sequentially outputs a frame image showing a situation in a soccer match to the broadcasting station 6 every predetermined period of time. The broadcasting station 6 sequentially outputs the received frame image to the client 3, which in turn sequentially displays the image received from the broadcasting station 6 on the UI unit 32 such as a display or the like. In this manner, in this embodiment, the image capturing device 5 outputs to the client 3 a motion picture including at least one frame image showing an ongoing soccer match, so that a user of the client 3 can enjoy a live broadcasting soccer match.

Figure 3:
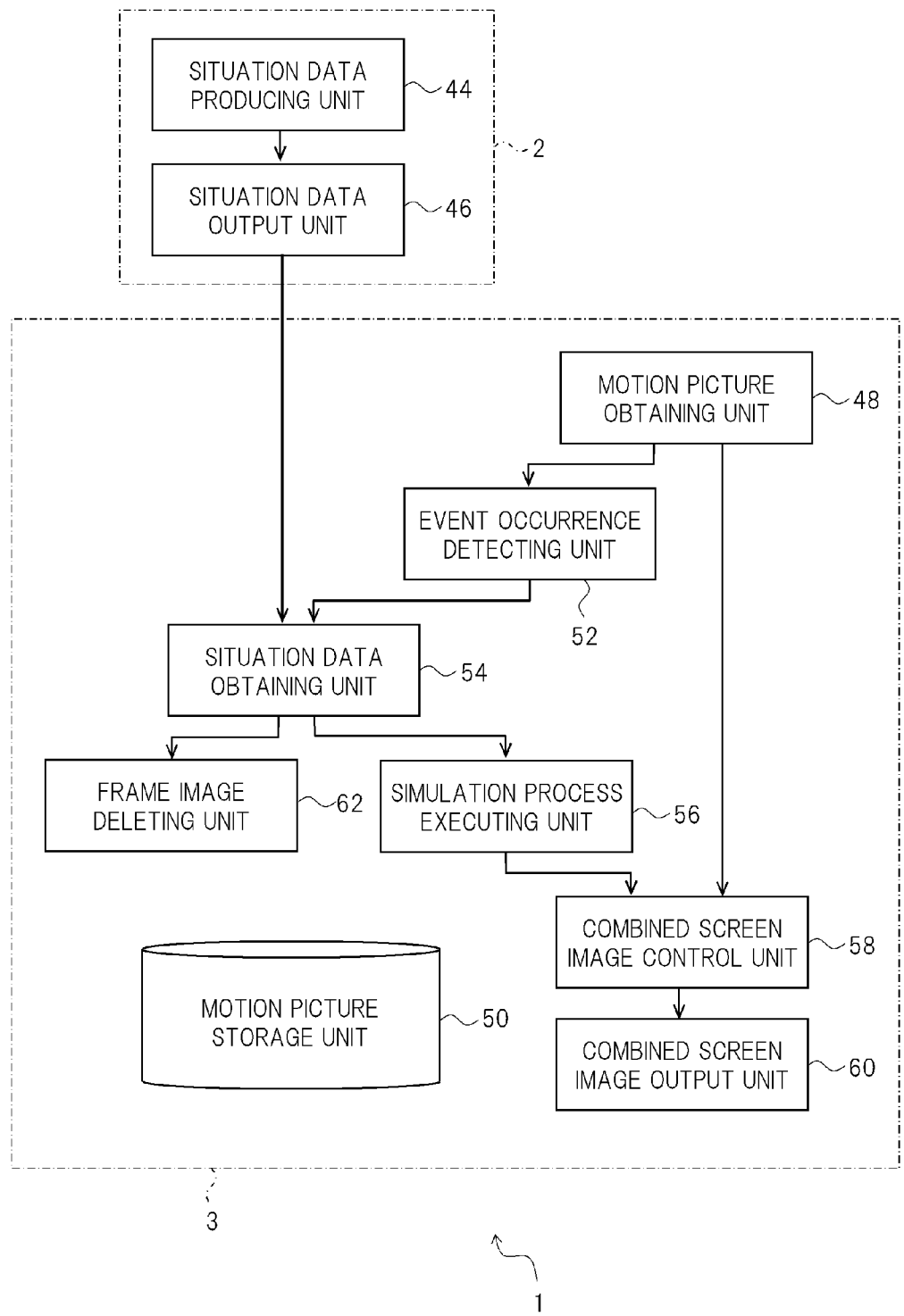
FIG. 3 is a functional block diagram showing one example of functions realized in an information processing system according to this embodiment.

Below, functions realized in the information processing system 1 according to this embodiment will be described. FIG. 3 is a functional block diagram showing one example of functions realized in the information processing system 1 according to this embodiment.

As shown in FIG. 3, the server 2 included in the information processing system 1 according to this embodiment has a situation data producing unit 44 and a situation data output unit 46, which are realized mainly using the control unit 20 of the server 2. These elements are realized by executing a program installed in the server 2, which is a computer, by the control unit 20 of the server 2. The program is supplied to the server 2 via a computer readable information transmission medium, such as, e.g., a CD-ROM, a DVD-ROM, or the like, or a communication network, such as the Internet or the like.

As shown in FIG. 3, the client 3 included in the information processing system 1 according to this embodiment comprises a motion picture obtaining unit 48, a motion picture storage unit 50, an event occurrence detecting unit 52, a situation data obtaining unit 54, a simulation process executing unit 56, a combined screen image control unit 58, a combined screen image output unit 60, and a frame image deleting unit 62. The motion picture storage unit 50 is realized mainly using the storage unit 31 of the client 3, and the other elements are realized mainly using the control unit 30 of the client 3. These elements are realized by executing a program installed in the client 3, which is a computer, by the control unit 30 of the client 3. The program is supplied to the client 3 via a computer readable information transmission medium, such as, e.g., a CD-ROM, a DVD-ROM, or the like, or a communication network, such as the Internet or the like.

Figure 4:
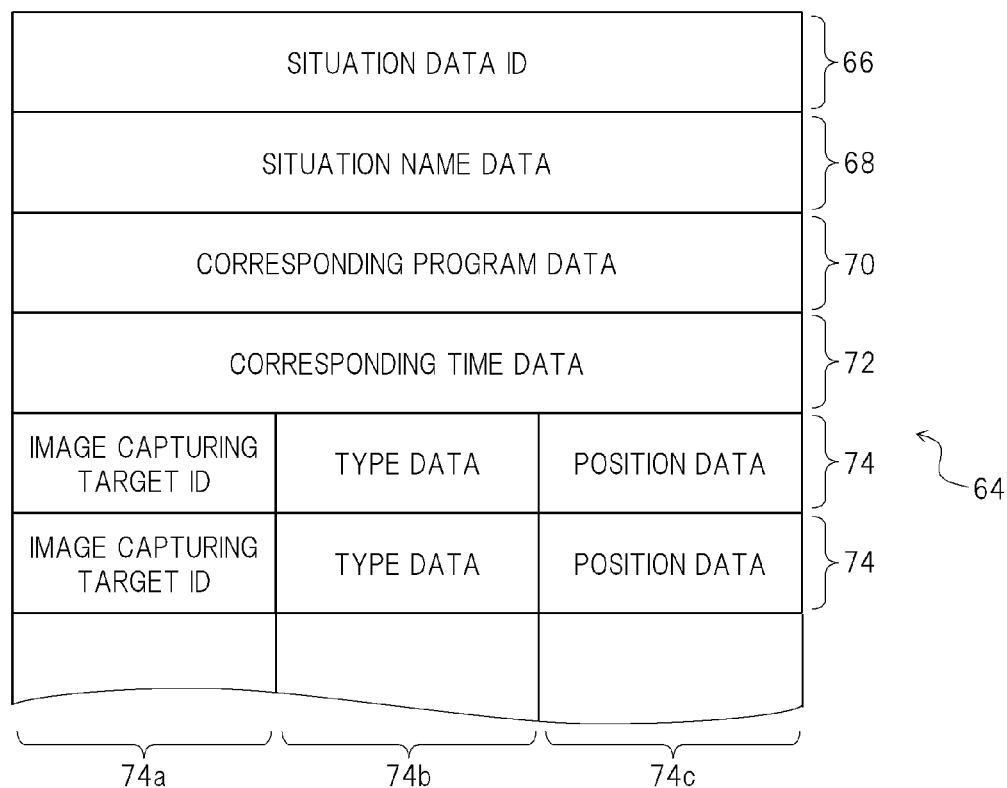
FIG. 4 is a diagram showing one example of a data structure of situation data in this embodiment.

The situation data producing unit 44 produces situation data 64 describing a situation in which an image capturing target of which image is captured by the image capturing device 5 is situated (hereinafter referred to as a "situation of an image capturing target") (see FIG. 4). FIG. 4 shows one example of a data structure of the situation data 64. Specifically, in this embodiment, for example, a person who creates situation data (a situation data creator), while watching a soccer match in a soccer stadium, inputs data concerning a situation in the soccer match (specifically, e.g., the position and/or body orientation of a soccer player 40, the position of the soccer ball 42, and so forth) on a situation data production screen image (not shown) shown on the UI unit 22 such as a display or the like of the server 2, using the UI unit 22 such as a mouse, a keyboard, or the like. A situation data creator inputs data concerning, e.g., a set-play scene such as a corner kick, a free kick, a penalty kick, and so forth and/or a scene immediate before a goal scored. A situation data creator may input data with a predetermined time interval (e.g., five-minute interval), the data relating to a situation in a soccer match at that time. Then, the situation data producing unit 44 produces situation data 64 describing a situation in the soccer match, based on the information input by the situation data creator. Note that the situation data producing unit 44 may carry out a publicly known image recognition process to a frame image or a motion picture captured by the image capturing device 5, thereby producing situation data 64 describing a situation in a soccer match. In this manner, the situation data producing unit 44 may produce situation data 64 describing a part of a situation of an image capturing target of which image is captured by the image capturing device 5 (specifically, e.g., a specific situation, such as a free kick, a penalty kick, and so forth, in the whole soccer match).

Template data describing a situation in a past soccer match may be stored in advance in the storage unit 21 of the server 2, so that the situation data producing unit 44 may produce the situation data 64, based on the template data. This enables efficient production of the situation data 64 by the situation data producing unit 44.

In this embodiment, as shown in, e.g., FIG. 4, the situation data 64 includes a situation data ID (an identification of situation data) 66, situation name data 68 reporting the name of a situation, corresponding program data 70 reporting at least one program (e.g., a game program in this embodiment) that is usable with the situation data 64, corresponding time data 72, and at least one image capturing target data 74, in which the corresponding time data 72 specifies a time relating to the situation described by the situation data (e.g., a time point, a time period, and the like). In this embodiment, specifically, the corresponding time data 72 specifies a time. The corresponding time data 72 may specify a period of time elapsed after the start of a match, a period corresponding to a situation (e.g., the start and end time of a period corresponding to a situation), or the like.

In this embodiment, each of the image capturing target data 74 corresponds to an image capturing target, such as, e.g., the soccer player 40, the soccer ball 42, and so forth, and includes an image capturing target ID (an identifier of an image capturing target) 74a, type data 74b specifying the type of an image capturing target (e.g., the soccer ball 42, the soccer player 40, and so forth), and position data 74c. Specifically, the position data 74c specifies, e.g., the coordinates (e.g., two or three dimensional coordinates) of the position of an image capturing target in the soccer field (the soccer ball 42, the soccer player 40, and so forth), and may include data specifying orientation (e.g., specifying a directional vector corresponding to the orientation of the body of the soccer player 40).

The situation data producing unit 44 may produce situation data 64 describing, e.g., environment in the stadium (e.g., temperature and wind direction) and may produce situation data 64 describing a situation of an image capturing target of which image is not being captured (e.g., a standby soccer player 40). Further, the situation data producing unit 44 may produce the situation data 64 according to a predetermined rule (e.g., with a predetermined time interval, such as e.g., a five-minute interval).

The situation data output unit 46 outputs the situation data 64. In this embodiment, the situation data output unit 46 outputs the situation data 64 to the storage unit 21 of the server 2. The situation data output unit 46 may output the situation data 64 according to a predetermined rule (e.g., with a predetermined time interval, such as, e.g., a five-minute interval). Note that the situation data output unit 46 may output the produced situation data 64 to the storage unit 21 of the server 2 when the situation data producing unit 44 produces the situation data 64. Note that an interval in producing the situation data 64 by the situation data producing unit 44 may correspond to an interval in outputting the situation data 64 by the situation data output unit 46.

The motion picture obtaining unit 48 obtains a motion picture including at least one frame image produced by the image capturing device 5. In this embodiment, the motion picture obtaining unit 48 obtains a motion picture correlated to sound data and outputs the obtained motion picture to the motion picture storage unit 50, which in turn stores the motion picture. In this embodiment, the motion picture obtaining unit 48 outputs a motion picture corresponding to, e.g., a predetermined broadcasting period (e.g., fifteen minutes) as a single data item (e.g., one file) to the motion picture storage unit 50. In this manner, e.g., at least one file of a motion picture corresponding to a fifteen-minute broadcasting period is stored in the motion picture storage unit 50 in this embodiment.

The motion picture obtaining unit 48 may output to the motion picture storage unit 50, the file of a motion picture so as to be correlated to data specifying a time relating to the motion picture (e.g., data specifying start and end time of broadcasting) or data specifying a time for storage (e.g., data specifying start and end time for storage) specified by the frame ID, the image captured time data, broadcasting time data, and so forth.

Based on the motion picture and/or sound data obtained by the motion picture obtaining unit 48, the event occurrence detecting unit 52 detects occurrence of a predetermine event to an image capturing target. In this embodiment, the event occurrence detecting unit 52 detects an event indicating excess of the sound volume corresponding to the sound data over a predetermined threshold (corresponding to an event indicating, e.g., increase of viewers' acclamation as the soccer ball 42 is goaled in a soccer match (that is, increase of viewers' excitement)) and/or an event indicating excess of the difference between successive frame images included in a motion picture (e.g., a difference in distribution of pixels included in a frame image) over a predetermined threshold (corresponding to an event indicating, e.g., start (end) of commercial messages).

The situation data obtaining unit 54 obtains the situation data 64. Specifically, in this embodiment, the situation data obtaining unit 54 obtains the situation data 64 stored in the storage unit 21 of the server 2. However, the situation data obtaining unit 54 may obtain situation data 64 other than that which has already been obtained. Moreover, the situation data obtaining unit 54 may obtain the latest situation data 64 (the situation data 64 last output to the storage unit 21) and/or may obtain a plurality of situation data 64 items.

The situation data obtaining unit 54 may obtain the situation data 64 with a predetermined time interval. An interval in outputting the situation data 64 by the situation data output unit 46 may correspond to an interval in obtaining the situation data 64 by the situation data obtaining unit 54. The situation data obtaining unit 54 may obtain the situation data 64 upon detection of an event by the event occurrence detecting unit 52.

Note that the situation data output unit 46 of the server 2 may output the situation data 64 directly to the client 3, so that the situation data obtaining unit 54 of the client 3 obtains the situation data 64.

Based on the situation data 64, the simulation process executing unit 56 carries out a simulation process for simulating a behavior of an image capturing target after the situation of the image capturing target, described by the situation data 64. Details of the simulation process will be described later.

Figure 5:
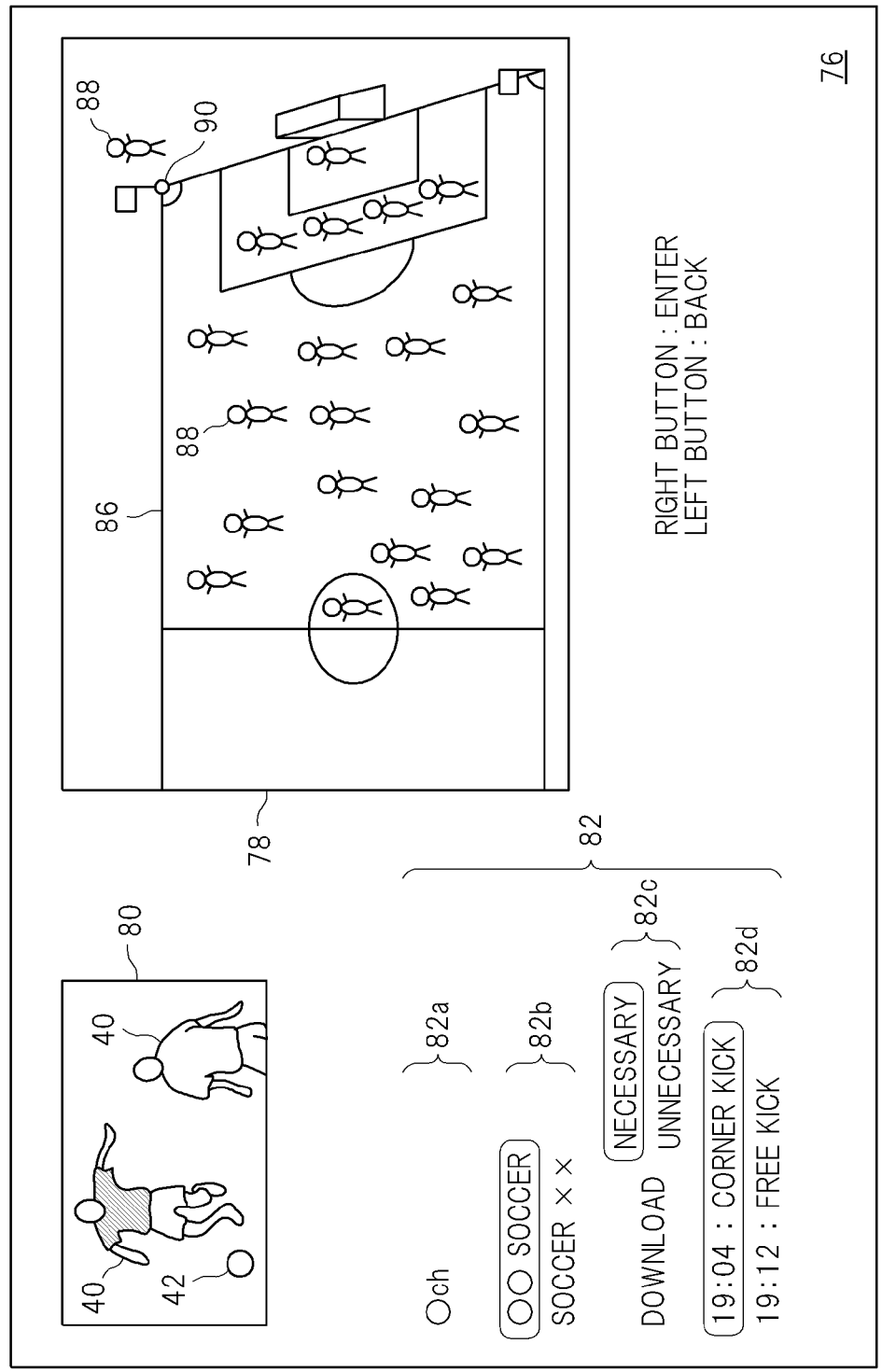
FIG. 5 is a diagram showing one example of a combined screen image.

The combined screen image control unit 58 combines a screen image showing a motion picture obtained by the motion picture obtaining unit 48 and a screen image produced by the simulation process executing unit 56 to thereby produce a combined screen image 76. Specifically, in this embodiment, the combined screen image control unit 58 produces a combined screen image 76, as shown in, e.g., FIG. 5, that includes a simulation result showing area 78 for showing a screen image reporting a result of a simulation process carried out by the simulation process executing unit 56 (e.g., a game screen image in this embodiment), a motion picture showing area 80 for showing a motion picture obtained by the motion picture obtaining unit 48, and a data presenting area 82.

In this embodiment, the data presenting area 82 includes, e.g., a channel number presenting area 82a for presenting the number of a channel corresponding to a motion picture obtained by the motion picture obtaining unit 48, a corresponding program name presenting area 82b for presenting a list of the name of a program that can carry out a simulation process, a download necessity reporting area 82c for reporting whether or not program downloading is necessary, and a corresponding situation data presenting area 82d for presenting a list of an image representing at least one situation data 64 obtained by the situation data obtaining unit 54 and relevant to the motion picture (e.g., an image showing a combination of a time specified by the corresponding time data 72 contained in the situation data 64 and a name described by the situation name data 68 contained in the situation data 64).

The combined screen image output unit 60 outputs the combined screen image 76 to the UI unit 32 such as a display or the like of the client 3. In this manner, a result of simulation by the simulation process executing unit 56 is output in this embodiment. Note that, in this embodiment, the combined screen image output unit 60 outputs sound corresponding to the sound data correlated to the motion picture obtained by the motion picture obtaining unit 48 via the UI unit 32 such as a speaker or the like.

In this embodiment, the combined screen image control unit 58 updates the combined screen image 76 in response to a user operation received via the UI unit 32 of the client 3. Specifically, upon receipt of an operation signal requesting, e.g., changing the channel, the combined screen image control unit 58 updates the channel number presented in the channel number presenting area 82a in the combined screen image 76 in response to the operation signal, and then updates the combined screen image 76 such that a motion picture corresponding to the updated channel number is shown in the motion picture showing area 80. Further, the combined screen image control unit 58 updates the combined screen image 76 such that an image representing at least one situation data 64 relevant to the motion picture is shown in the corresponding situation data presenting area 82d.

Further, the combined screen image control unit 58 updates the combined screen image 76 such that a list of the name of the program specified by the corresponding program data 70 contained in any situation data 64 relevant to the motion picture is shown in the corresponding program name presenting area 82b. Note that although a program is correlated to the situation data 64 in this embodiment, a program may be correlated to a motion picture or a TV program instead. In the latter case, the combined screen image control unit 58 may update the combined screen image 76 such that a list of the name of a program corresponding to the motion picture is shown in the corresponding program name presenting area 82b.

In this embodiment, a user can select a name shown in the corresponding program name presenting area 82b, using the UI unit 32. That is, a user can select a program. Further, a user, using the UI unit 32, can select one of the images representing the situation data 64 and presented in the corresponding situation data presenting area 82d. That is, a user can select the situation data 64. Note that the combined screen image control unit 58 may update the combined screen image 76 such that a list of the name of the program specified by the corresponding program data 70 contained in the situation data 64 selected by a user is shown in the corresponding program name presenting area 82b.

In a case where the program selected by a user is already installed in the client 3, the combined screen image control unit 58 updates the combined screen image 76 such that no need of downloading of the game program is reported in the download necessity reporting area 82c. Meanwhile, in a case where the program selected by a user is not yet installed in the client 3, the combined screen image control unit 58 updates the combined screen image 76 such that necessity of downloading of the game program is reported in the download necessity reporting area 82c. In the latter case, the combined screen image control unit 58 may update the combined screen image 76 so as to additionally show an image reporting an estimated period of time necessary to complete the downloading. Note that the combined screen image control unit 58 may obtain data relating to an estimated period of time for downloading a game program from a program distribution server (not shown) connected thereto via the communication unit 33 of the client 3 with, e.g., a predetermined time interval.

The combined screen image output unit 60 displays the thus updated combined screen image 76.

Figure 6:
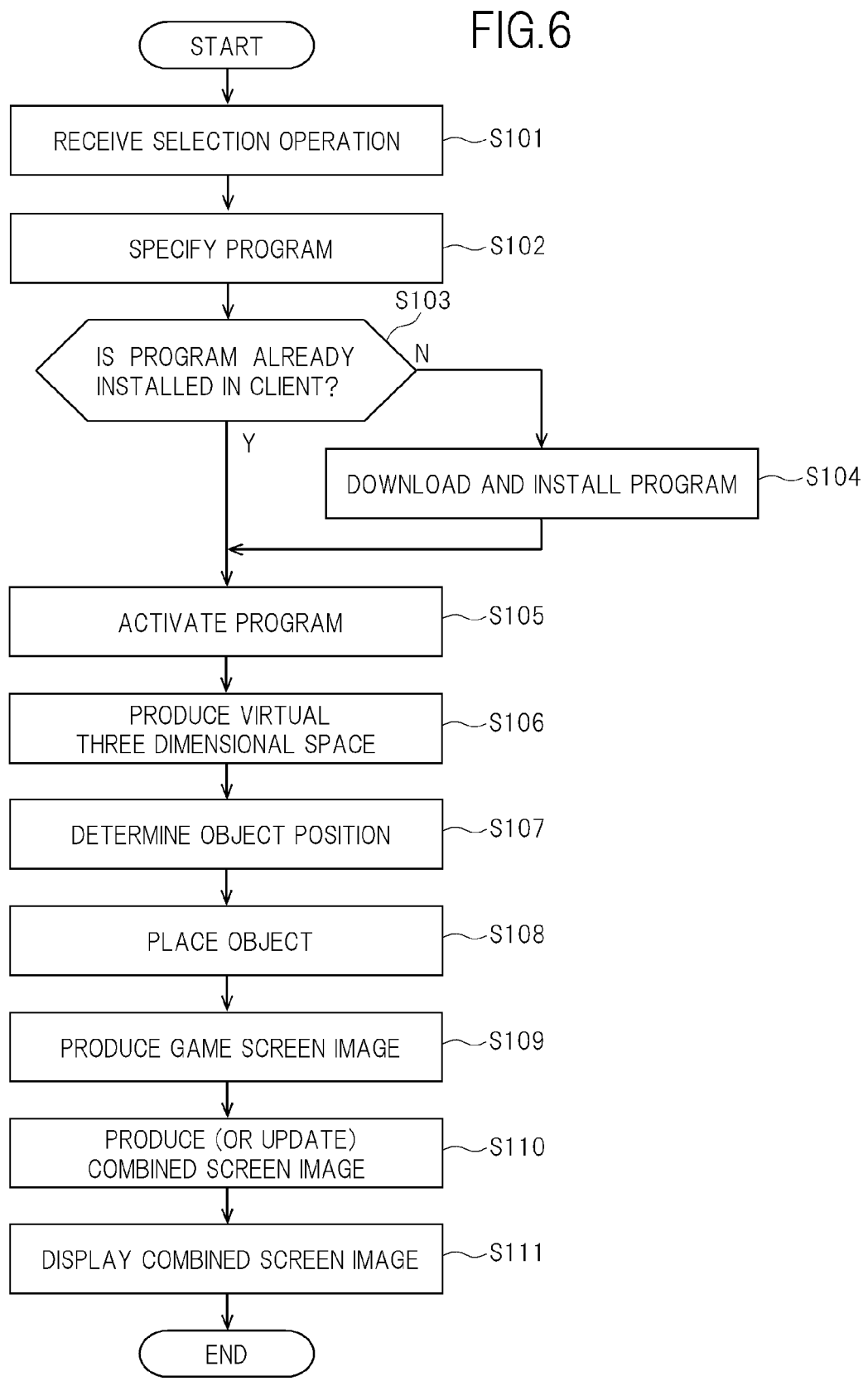
FIG. 6 is a diagram showing one example of a flow of a process carried out in a client according to this embodiment.

Here, one example of a flow of an initializing process to be carried out in the client 3 as a pre-process of a simulation process for simulating a behavior in this embodiment will be described with reference to the flowchart in FIG. 6.

Initially, the simulation process executing unit 56 receives a selection operation (e.g. an operation signal) by a user to select a program and situation data 64 (S101), and then specifies the program selected by the user (S102).

Then, the simulation process executing unit 56 determines whether or not the program is already installed in the client 3 (S103). When such a program is not yet installed (S103: N), the simulation process executing unit 56 downloads the program from a program distribution server (not shown), and installs the downloaded program to the client 3 (S104).

After the process at S104 is completed or when it is determined at S103 that such a program is already installed (S103: Y), the simulation process executing unit 56 activates the program (e.g., a soccer game program) (S105). As described above, in a case where a program is already installed in the client 3, program downloading is not carried out in this embodiment, so that a data transmission amount and a period of time necessary before program execution can be reduced.

Figure 7:
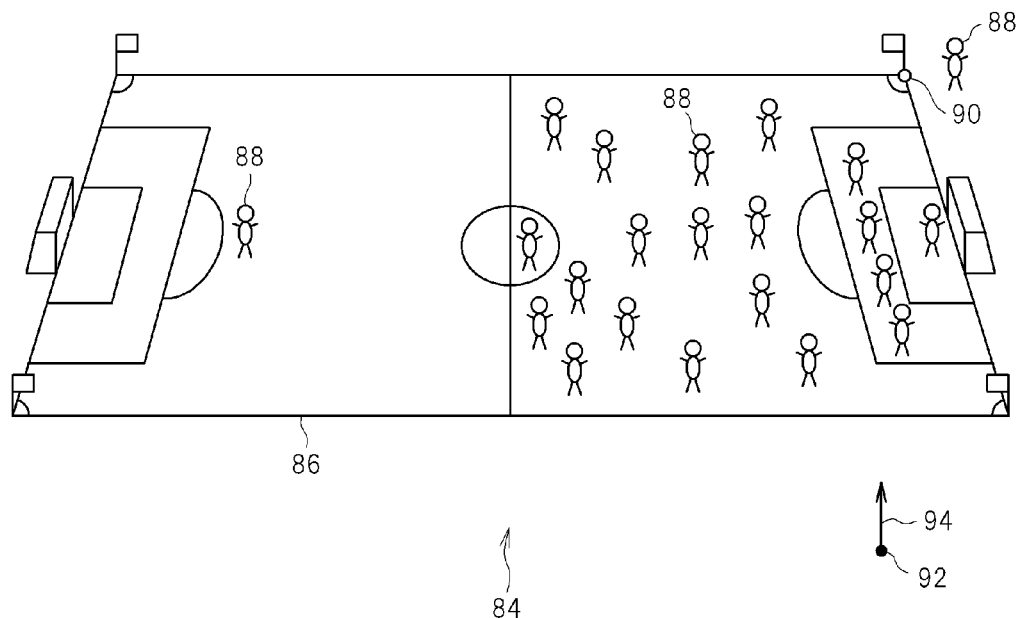
FIG. 7 is a diagram showing one example of a virtual three dimensional space.

The simulation process executing unit 56 produces a virtual three dimensional space 84 shown in FIG. 7, based on the situation data 64 selected by a user (S106), and then determines, based on, e.g., the situation data 64, the position in the virtual three dimensional space 84, of a three dimensional polygon object such as the soccer field 86, the player object 88, the ball object 90, and so forth at a time specified by the corresponding time data 72 contained in the situation data 64 (S107). Specifically, based on the position data 74c contained in the image capturing target data 74 relating to the soccer player 40 (or the soccer ball 42), the simulation process executing unit 56 determines the position in the soccer field 86, of the player object 88 (or the ball object 90) corresponding to the soccer player 40 (or the soccer ball 42).

Then, the simulation process executing unit 56 places an object such as the player object 88, the ball object 90, or the like in the determined position (S108). Further, the simulation process executing unit 56 produces a game screen image showing a picture obtained by viewing from a viewpoint 92 defined in the virtual three dimensional space 84, in the viewing direction 94 (S109).

Then, the combined screen image control unit 58 produces (or updates) the combined screen image 76 so as to include the produced game screen image shown in the simulation result showing area 78 (S110). Thereafter, the combined screen image output unit 60 displays the combined screen image 76 on the UI unit 32 such as a display or the like (S111).

According to this embodiment, generally, the situation data 64 is data necessary in executing a game program (e.g., data defining a parameter), and the size thereof is expected to be smaller than that of the whole game program. Thus, a period of time necessary for the situation data obtaining unit 54 to obtain the situation data 64 is expected to be relatively short.

In this embodiment, after execution of the initializing process by the client 3, upon receipt of a simulation process start request (a start operation) from a user, the client 3 carries out a process (e.g., a game process in this embodiment) for simulating the behavior of the player object 88 or the ball object 90 corresponding to the behavior of the soccer player 40 or the soccer ball 42, which is an image capturing target, after the situation in the virtual three dimensional space 84 at the time of completion of the initializing process (e.g., after the situation of the image capturing target at the time specified by the corresponding time data 72 in this embodiment).

Figure 8:
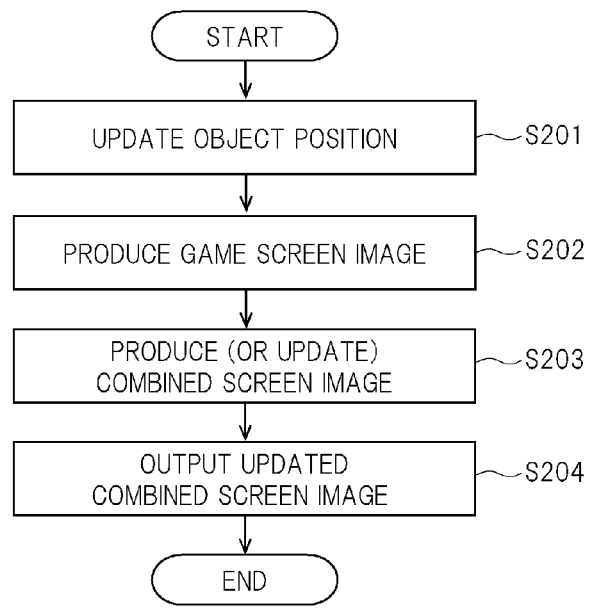
FIG. 8 is a diagram showing one example of a flow of a process carried out in a client according to this embodiment.

In this embodiment, the client 3 updates the game screen image every predetermined period of time (e.g., $1/60^{th}$ of a second) and displays the combined screen image 76 that includes the updated game screen image shown in the simulation result showing area 78 on the UI unit 32 such as a display or the like. Below, an example of a flow of a process to be carried out every predetermined period (e.g., $1/60^{th}$ of a second) after the start of the behavior simulating process will be described with reference to the flowchart in FIG. 8.

Initially, the simulation process executing unit 56 updates the position of each object placed in the virtual three dimensional space 84, based on the current position of the object in the virtual three dimensional space 84 (e.g., the position of the object in the immediately preceding frame), a movement rule (e.g., a movement rule for the ball object 90 according to physical law and/or the player object 88) pre-set to the program (e.g., a game program), and the movement direction and amount of the object (e.g., the player object 88) calculated based on an operation signal received from a user (S201). As described above, the simulation process executing unit 56 may receive a user operation during the above described simulation process and change the behavior of an object (e.g., the player object 88) in the virtual three dimensional space 84 according to the operation. With the above, a user can enjoy a game such as a soccer game or the like along the lines of a real soccer match. However, note that the simulation process executing unit 56 may not utilize the movement direction and amount calculated based on an operation signal when updating an object position.

Thereafter, the simulation process executing unit 56 produces a game screen image corresponding to the updated virtual three dimensional space 84 (S202), and the combined screen image control unit 58 produces (or updates) the combined screen image 76 including the produced game screen image shown in the simulation result showing area 78 (S203). Then, the combined screen image output unit 60 displays the updated combined screen image 76 on the UI unit 32 such as a display or the like (S204).

In this manner, the game screen image included in the combined screen image 76 is updated every predetermined period of time (e.g., $\frac{1}{60}^{th}$ of a second). Note that, in the above described process example, a simulation process for simulating the behavior of an image capturing target after the time specified by the corresponding time data 72 contained in the situation data 64 is carried out. Further, in the above described process example, an object corresponding to an image capturing target is placed in the position specified by the position data 74c contained in each image capturing target data 74, and the behavior of the image capturing target corresponding to the object after the situation with the image capturing target positioned therein as described above is simulated.

The simulation process executing unit 56 may change the position of an object (e.g., the player object 88) in the virtual three dimensional space 84 in response to an operation received from a user during the period from the end of the above-described initializing process to receipt of a request for starting the simulation process. With this arrangement, a user can enjoy a game such as a soccer game or the like along the lines of a soccer match in a situation different from the situation specified by the situation data 64 (e.g., a situation with the player object 88 in a slightly different position).

For example, the simulation process executing unit 56 may execute a game program that is set so as to meet the timing specified by the corresponding time data 72 contained in the situation data 64 (e.g., the timing in the match in a soccer game is set to 25 minutes in the first half). With this arrangement, a user can more enjoy the sense of presence in a real soccer match.

The frame image deleting unit 62 deletes at least a part of at least one frame image contained in a motion picture, the part specified based on the situation data 64. Specifically, the frame image deleting unit 62 deletes the file of a motion picture other than that which includes the time specified by the corresponding time data 72 contained in the situation data 64 obtained by the situation data obtaining unit 54. However, the frame image deleting unit 62 may delete the file of a motion picture that includes the time specified by the corresponding time data 72 contained in the situation data 64 with respect to which the simulation process executing unit 56 carries out a simulation process.

In this embodiment, the frame image deleting unit 62 specifies the file of a motion picture to be deleted, based on the time specified by the corresponding time data 72 contained in the situation data 64 with respect to which the simulation process executing unit 56 carries out a simulation process and the time specified by the data correlated to the file of each motion picture, and deletes the file. The frame image deleting unit 62 may delete the file of a motion picture stored in the motion picture storage unit 50 with a predetermined time interval. For example, in a case in which the capacity of the storage unit 31 (e.g., a memory or a hard disk drive) of the client 3 is small, such as the client 3 being a portable phone, deletion of the file of a motion picture as described above can prevent shortage of the capacity of the storage unit 31. Note that, however, file deletion by the frame image deleting unit 62 of the client 3 is not mandatory.

Note that the present invention is not limited to the above described embodiment.

For example, the situation data obtaining unit 54 may specify a channel corresponding to a motion picture (a TV program) output to the UI unit 32 such as a display or the like, and obtain the situation data 64 from the storage unit 21 of the server 2 corresponding to the channel (e.g., the storage unit 21 of the server 2 corresponding to the broadcasting station 6 that provides the TV program).

The present invention may be applied to broadcasting other than live broadcasting (e.g., broadcasting of a recorded TV program, re-broadcasting, and so forth). In this case, when the broadcasting station 6 outputs a frame image to the client 3, the situation data output unit 46 may output situation data 64 corresponding to the frame image to the storage unit 21 of the server 2.

The client 3 may obtain from a timetable data providing server (not shown) timetable data describing the title, the start and end time of a TV program, and so forth. The timetable data may be correlated to data specifying a program (e.g., a game program) corresponding to a TV program, and the client 3 may display the timetable data on the UI unit 32 such as a display or the like. When a motion picture corresponding to a TV program selected upon receipt of a TV program selection operation by a user is received from the broadcasting station 6, the motion picture may be stored in the storage unit 31 (that is, a reservation recording process is carried out). Note that, in the above, the client 3 may obtain the situation data 64 corresponding to the motion picture from the server 2, and output to the storage unit 31. Further note that the client 3 may obtain a program corresponding to the TV program selected by a user from the program distribution server.

In response to a user request, the client 3 may reproduce the combined screen image 76 including a motion picture stored in the storage unit 31. In the above, an image representing the situation data 64 relating to the motion picture may be shown in the data presenting area 82 in the combined screen image 76. Obviously, in the above, a simulation process may be carried out based on the situation data 64 upon receipt of a user selection operation to select the situation data 64.

Further, based on an operation received from a user, the client 3 may produce a motion picture showing a simulation process being carried out (e.g., a picture showing a soccer game being carried out) and output to the storage unit 31, and in response to a user request, output the motion picture to a motion picture distribution server (not shown) that distributes motion pictures.

While a TV program with respect to which the above-described simulation process is carried out is on the air, a button of a remote controller corresponding to the channel via which the TV program is broadcast may be lit or the channel number may be shown on the UI unit 32 such as a display or the like on the client 3 side.

For example, the client 3 need not have the broadcasting receiving unit 34. The client 3 may not display a motion picture produced by the image capturing device 5 on the UI unit 32 such as a display or the like.

For example, the simulation process executing unit 56 may execute a program for a golf game, a car race game, a shogi game, or the like to perform a simulation process, based on the situation data 64 corresponding to a situation in the golf match (e.g., a second shot in hole 18 or the like), a situation in the car race (e.g., $36^{th}$ lap or the like), a situation in the shogi match (e.g., $97^{th}$ move or the like). The simulation process executing unit 56 may execute a boxing game program to carry out a simulation process, based on the situation data 64 corresponding to a situation in the boxing match (e.g., a condition in stamina determined based on the appearance of a player). Further, the simulation process executing unit 56 may execute a simulation program other than a game program.

Regardless of whether the image capturing device 5 is capturing an image of an image capturing target, the situation data producing unit 44 may produce the situation data 64 describing a situation in a sport match being performed in the real world.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing device, comprising:
    situation data obtaining means for obtaining situation data describing a situation of an image capturing target of which image is captured by image capturing means for producing an image to be output;
    simulation process executing means for carrying out, based on the situation data, a simulation process for simulating a behavior of the image capturing target after the situation of the image capturing target, described by the situation data; and
    output means for outputting a result of the simulation process by the simulation process executing means, wherein
    the simulation process executing means changes the behavior of the image capturing target in the simulation process in response to an operation received from a user,
    the situation data specifies at least a position of the image capturing target, and
    the simulation process executing means carries out a simulation process for simulating the behavior of the image capturing target after a situation in which the image capturing target is placed in the position specified by the situation data.

2. The information processing device according to claim 1, wherein
    the situation data includes corresponding time data specifying a time relating to the situation of the image capturing target, and
    the simulation process executing means carries out a simulation process for simulating the behavior of the image capturing target after the time specified by the corresponding time data.

3. The information processing device according to claim 1, wherein
    the situation data obtaining means obtains a plurality of situation data, and
    the simulation process executing means, based on situation data selected by a user from among the plurality of situation data, carries out a simulation process for simulating the behavior of the image capturing target after the situation of the image capturing target, described by the situation data.

4. The information processing device according to claim 1, further comprising
    event occurrence detecting means for detecting occurrence of a predetermined event to the image capturing target;
    wherein the situation data obtaining means obtains the situation data upon detection of occurrence of an event by the event occurrence detecting means.

5. The information processing device according to claim 1, wherein
    the image capturing means produces a motion picture including at least one frame image by capturing an image of the image capturing target, and
    the information processing device further comprises
    motion picture obtaining means for obtaining the motion picture produced by the image capturing means,
    motion picture storage means for storing the motion picture obtained by the motion picture obtaining means, and
    frame image deleting means for deleting at least a part of at least one frame image included in the motion picture, the part being specified by the situation data.

6. The information processing device according to claim 1, wherein the situation data obtaining means obtains situation data describing a part of the situation of the image capturing target of which image is captured by the image capturing means.

7. The information processing device of claim 1, further comprising:
    broadcasting receiving means for receiving a broadcasting signal from a broadcasting station;
    obtaining means for obtaining data in accordance with the broadcasting signal received by the broadcasting receiving means from outside; and
    game program executing means for executing a game program, wherein
    the game program executing means outputs information in accordance with the data obtained by the obtaining means, and
    the game program executing means changes content of execution of the game program in response to an operation by a user.

8. An information processing system including a first image processing device and a second image processing device, wherein
    the first information processing device includes
    situation data producing means for producing situation data describing a situation of an image capturing target of which image is captured by image capturing means for producing an image to be output, and
    situation data output means for outputting the situation data produced by the situation data producing means,
    the second information processing device includes
    situation data obtaining means for obtaining the situation data,
    simulation process executing means for carrying out, based on the situation data, a simulation process for simulating a behavior of the image capturing target after the situation of the image capturing target, described by the situation data, and output means for outputting a result of the simulation process by the simulation process executing means, and the simulation process executing means changes the behavior of the image capturing target in the simulation process in response to an operation received from a user, wherein:

the situation data specifies at least a position of the image capturing target, and the simulation process executing means carries out a simulation process for simulating the behavior of the image capturing target after a situation in which the image capturing target is placed in the position specified by the situation data.

9. The information processing system of claim 8, wherein:

the first information processing device includes data output means for outputting data in accordance with a request received from the second information processing device, the second information processing device includes broadcasting receiving means for receiving a broadcasting signal from a broadcasting station, obtaining means for obtaining data in accordance with the broadcasting signal received by the broadcasting receiving means from the first information processing device, and game program executing means for executing a game program, the game program executing means outputs information in accordance with the data obtained by the obtaining means, and the game program executing means changes content of execution of the game program in response to an operation by a user.

10. An information processing method, comprising:

obtaining situation data describing a situation of an image capturing target of which image is captured by image capturing means for producing an image to be output;

carrying out, based on the situation data, a simulation process for simulating a behavior of the image capturing target after the situation of the image capturing target, described by the situation data;

outputting a result of the simulation process executed during the simulation process, changing, during the simulation process, the behavior of the image capturing target in the simulation process in response to an operation received from a user, wherein:

the situation data specifies at least a position of the image capturing target, and the simulation process for simulating the behavior of the image capturing is carried out after a situation in which the image capturing target is placed in the position specified by the situation data.

11. The information processing method of claim 10, further comprising:

receiving a broadcasting signal from a broadcasting station;

obtaining data in accordance with the received broadcasting signal from outside; and executing a game program, including outputting information in accordance with the data obtained, and changing content of execution of the game program in response to an operation by a user.

12. A non-transitory, computer readable information storage medium for storing a program that causes a computer to execute actions, comprising:

obtaining situation data describing a situation of an image capturing target of which image is captured by image capturing means for producing an image to be output;

carrying out, based on the situation data, a simulation process for simulating a behavior of the image capturing target after the situation of the image capturing target, described by the situation data;

outputting a result of the simulation process by the simulation process executing means; and changing the behavior of the image capturing target in the simulation process in response to an operation received from a user, wherein:

the situation data specifies at least a position of the image capturing target, and the simulation process for simulating the behavior of the image capturing target is carried out after a situation in which the image capturing target is placed in the position specified by the situation data.

13. An information processing device, comprising:

situation data obtaining means for obtaining situation data describing a situation in a sport match;

activating means for reading a game program stored in storage means and activating the game program read;

simulation data producing means for producing simulation data for simulating the sport match, based on the situation data;

simulation process executing means for carrying out a simulation process based on the simulation data in response to an operation received from a user; and output means for outputting a result of the simulation process by the simulation process executing means, wherein:

the situation data specifies at least a position of the image capturing target, and the simulation process executing means carries out a simulation process for simulating the behavior of the image capturing target after a situation in which the image capturing target is placed in the position specified by the situation data.

14. An information processing system including a first image processing device and a second image processing device, wherein the first information processing device includes situation data producing means for producing situation data describing a situation in a sport match, and situation data outputting means for outputting the situation data produced by the situation data producing means, the second information processing device includes situation data obtaining means for obtaining the situation data, activating means for reading a game program stored in storage means and activating the game program read, simulation data producing means for producing simulation data for simulating the sport match, based on the situation data, simulation process executing means for carrying out a simulation process based on the simulation data in response to an operation received from a user, and output means for outputting a result of the simulation process by the simulation process executing means, wherein:

the situation data specifies at least a position of the image capturing target, and the simulation process executing means carries out a simulation process for simulating the behavior of the image capturing target after a situation in which the image capturing target is placed in the position specified by the situation data.

15. An information processing method, comprising:

obtaining situation data describing a situation in a sport match;

reading a game program stored in storage means and activating the game program read;

producing simulation data for simulating the sport match, based on the situation data;

carrying out a simulation process based on the simulation data in response to an operation received from a user; and outputting a result of the simulation process, wherein:

the situation data specifies at least a position of the image capturing target, and the simulation process for simulating the behavior of the image capturing target is carried out after a situation in which the image capturing target is placed in the position specified by the situation data.

16. A non-transitory, computer readable information storage medium for storing a program that causes a computer to execute actions, comprising:

obtaining situation data describing a situation in a sport match;

reading a game program stored in a storage means and activating the game program read;

producing simulation data for simulating the sport match, based on the situation data;

carrying out a simulation process based on the simulation data in response to an operation received from a user; and outputting a result of the simulation process, wherein:

the situation data specifies at least a position of the image capturing target, and the simulation process for simulating the behavior of the image capturing target is carried out after a situation in which the image capturing target is placed in the position specified by the situation data.

17. The non-transitory, computer readable information storage medium for storing a program that causes a computer to execute actions, further comprising:

receiving a broadcasting signal from a broadcasting station;

obtaining data in accordance with the broadcasting signal received from outside; and executing a game program, including outputting information in accordance with the data obtained, and changing content of execution of the game program in response to an operation by a user.

* * * * *